(12) United States Patent
Abe et al.

(10) Patent No.: US 8,393,800 B2
(45) Date of Patent: Mar. 12, 2013

(54) NEEDLE ROLLER BEARING AND CRANKSHAFT SUPPORT STRUCTURE

(75) Inventors: Katsufumi Abe, Iwata (JP); Akihiko Katayama, Iwata (JP)

(73) Assignee: NTN Corporation, Osaka (JP)

( * ) Notice: Subject to any disclaimer, the term of this patent is extended or adjusted under 35 U.S.C. 154(b) by 572 days.

(21) Appl. No.: 12/667,388

(22) PCT Filed: Jun. 3, 2008

(86) PCT No.: PCT/JP2008/060202
§ 371 (c)(1),
(2), (4) Date: Dec. 31, 2009

(87) PCT Pub. No.: WO2009/004884
PCT Pub. Date: Jan. 8, 2009

(65) Prior Publication Data
US 2010/0195945 A1  Aug. 5, 2010

(30) Foreign Application Priority Data

Jul. 3, 2007 (JP) ................................. 2007-175319
Jul. 3, 2007 (JP) ................................. 2007-175320

(51) Int. Cl.
*F16C 33/58* (2006.01)
*F16C 9/00* (2006.01)
(52) U.S. Cl. ........................................ 384/570; 384/457
(58) Field of Classification Search .................. 384/456, 384/457, 492, 498, 499, 501–503, 505, 510, 384/513, 559, 560, 570, 572
See application file for complete search history.

(56) References Cited

U.S. PATENT DOCUMENTS

| | | | | |
|---|---|---|---|---|
| 1,481,705 A | * | 1/1924 | Gimeno | 384/559 |
| 1,500,902 A | * | 7/1924 | Sewell | 384/570 |
| 7,866,891 B2 | * | 1/2011 | Waseda et al. | 384/457 |
| 2005/0265644 A1 | * | 12/2005 | Waseda | 384/499 |

FOREIGN PATENT DOCUMENTS

| | | |
|---|---|---|
| JP | 7-506889 A | 7/1995 |
| JP | 10-292822 A | 11/1998 |
| JP | 2002-106572 | 4/2002 |
| JP | 2003-065342 | 3/2003 |
| JP | 2005-214390 | 8/2005 |
| JP | 2007-010012 | 1/2007 |
| JP | 2007-127224 A | 5/2007 |
| JP | 2007-247818 A | 9/2007 |
| WO | 2006/098276 A1 | 9/2006 |

* cited by examiner

*Primary Examiner* — James Pilkington
(74) *Attorney, Agent, or Firm* — Clark & Brody (57) ABSTRACT

Needle roller bearing includes an outer ring having first outer ring member having center angle larger than 180° and second outer ring member having center angle smaller than 180°, needle rollers, a retainer having ring section pairs and column sections arranged between the pair of ring sections, d<X<D and the formula below are satisfied wherein D represents the outer ring inner diameter, r represents a needle roller radius, d represents the retainer outer diameter, and X represents a line segment length $l_1$ connecting circumferential ends of an inner diameter surface of the first outer ring member. When line $l_2$ passing through the center of the outer ring and parallel to segment $l_1$ passes through the column section, θ represents an angle between lines $l_2$ and $l_3$ connecting the center of the needle roller adjacent to the column section to the center of the outer ring, $$2\left\{\left(\frac{D}{2}-r\right)\cos\theta+r\right\} < X \quad (1)$$

9 Claims, 14 Drawing Sheets

PRIOR ART

NEEDLE ROLLER BEARING AND CRANKSHAFT SUPPORT STRUCTURE

TECHNICAL FIELD

The present invention relates to a needle roller bearing and more particularly, to a needle roller bearing to rotatably support a crankshaft.

BACKGROUND ART

Figure 14:
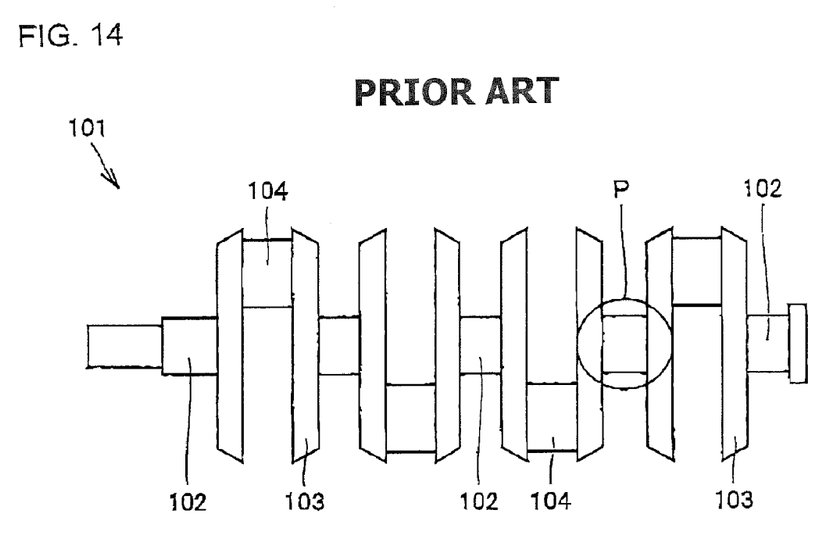
FIG. 14 is a view showing a conventional crankshaft.

Referring to FIG. 14, a conventional crankshaft 101 has a shaft section 102, a crank arm 103, and a crankpin 104 for arranging a con rod between the adjacent crank arms 103.

In addition, a rolling bearing to rotatably support the shaft section 102 of the above crankshaft 101 is disclosed in Japanese Patent Publication No. 7-506889, for example. The rolling bearing disclosed in the above patent document includes an outer ring, a plurality of rolling components arranged along an inner diameter surface of the outer ring, and a retainer to retain the plurality of rolling components.

The above rolling bearing is assembled by incorporating a roller and retainer assembly, the outer ring, and a housing into the shaft section 102 in this order. In addition, in order to enable them to be radially incorporated in the shaft section 102 sandwiched between the crank arms 103, the outer ring is a split type outer ring including a first arcuate section having a center angle larger than 180° and a second arcuate section having a center angle smaller than 180°.

Here, since the first section has a cut site dimension smaller than a maximum outer diameter of the roller and retainer assembly, it has to be elastically deformed in a direction to enlarge the cut site when incorporated. In addition, an elastic deformation volume of the first section increases as the center angle of the first section increases. Meanwhile, elastic deformability reduces with increasing thickness of the first section. Therefore, the outer ring cannot be easily incorporated depending on a dimensional relationship in the bearing.

DISCLOSURE OF THE INVENTION

Thus, it is an object of the present invention to provide a needle roller bearing having a split type outer ring, which can be easily incorporated into a rotation shaft.

A needle roller bearing according to the present invention includes a cylindrical outer ring formed by circumferentially connecting a first outer ring member having a center angle larger than 180° and a second outer ring member having a center angle smaller than 180°, a plurality of needle rollers arranged along an inner diameter surface of the outer ring, and a retainer including a pair of ring sections and a plurality of column sections arranged between the pair of ring sections, and having pockets for housing the needle rollers, between the adjacent column sections. Thus, $d < X < D$ and a formula (1) below are satisfied in which reference D represents an inner diameter dimension of the outer ring, reference r represents a radius of the needle roller, reference d represents an outer diameter dimension of the retainer, and reference X represents a length of a line segment $l_1$ connecting circumferential ends of an inner diameter surface of the first outer ring member, and when a line $l_2$ passing through the center of the outer ring and parallel to the line segment $l_1$ passes through the center (circumferential center) of the column section, reference $\theta$ represents an angle formed between the line $l_2$ and a line $l_3$ connecting the center of the needle roller adjacent to the above column section to the center of the outer ring.

[Formula 1]

$$2\left\{\left(\frac{D}{2} - r\right)\cos\theta + r\right\} < X \quad (1)$$

When the above dimensional relationships are satisfied, the first outer ring member can be incorporated without being elastically deformed. As a result, the needle roller bearing can be easily incorporated regardless of a thickness of the outer ring.

Preferably, the retainer is formed by circumferentially connecting two semi-circular retainer segments. Thus, the needle roller bearing satisfies the formula (1) when each of two abutment parts of the retainer segments is positioned on the line $l_2$. An interval between the adjacent needle rollers is largest at a position in which the split part between the retainer segments is involved. Thus, in the above configuration, the cut site dimension X of the first outer ring member can be small, that is, the center angle of the first outer ring member can be large.

Preferably, $0 < (D \cdot X)/D \leq 0.003$ is satisfied in which reference D represents the inner diameter dimension of the outer ring, and reference X represents the length of the line segment connecting the circumferential ends of the inner diameter surface of the first outer ring member. When the above dimensional relationship is satisfied, an elastic deformation volume of the outer ring at the time of incorporation can be small (0.3% or less of the inner diameter dimension D). As a result, the outer ring can be easily incorporated even when it is thick to some extent.

Preferably, the outer ring is split into the first and second outer ring members by natural cracking. The natural cracking can reduce production procedures and a processing time, as compared with a method using a cutting tool to cut the outer ring. As a result, the needle roller bearing can be improved in productivity.

Further preferably, the outer ring is subjected to bright quenching treatment. Thus, the outer ring has average hardness of 653 Hv or more. A mechanical property required for the outer ring, such as surface hardness (653 Hv or more) especially can be obtained by the bright quenching treatment. In addition, "Hv" in this specification means Vickers hardness.

As one embodiment, the retainer is formed of a metal material having been subjected to carburizing quenching or carbonitriding quenching treatment. Thus, the retainer has average hardness of 450 Hv or more. As another embodiment, the retainer is formed of an injection moldable synthetic resin. Thus, the retainer has a heat resistance temperature of 120° C. or more.

Preferably, the retainer is a split type retainer having a split line extending in an axial direction, on its circumference. When the retainer is the split type as well as the outer ring, the incorporation into the rotation shaft is further facilitated.

A crankshaft support structure according to the present invention includes a crankshaft and any one of the above-described needle roller bearings to rotatably support the crankshaft. When the above needle roller bearing is used, the crankshaft support structure can be superior in assembly property.

BEST MODE FOR CARRYING OUT THE INVENTION

Figure 1:
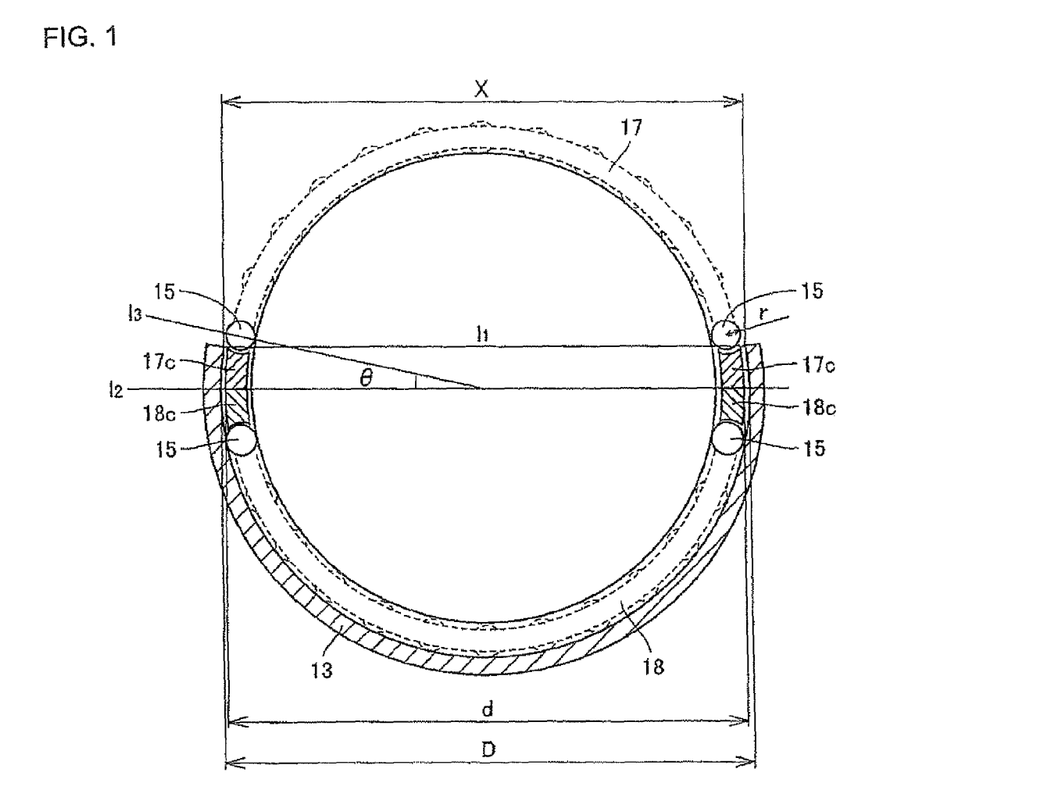
FIG. 1 is a view showing various dimensional relationships in a needle roller bearing shown in FIG. 2.

A description will be made of a needle roller bearing 11 according to one embodiment of the present invention with reference to FIGS. 1 to 3. FIG. 1 is a view showing dimensional relationships in the needle roller bearing 11, FIG. 2 is a view showing the needle roller bearing 11, and FIG. 3 is a view taken from a direction shown by an arrow III in FIG. 2.

Figure 2:
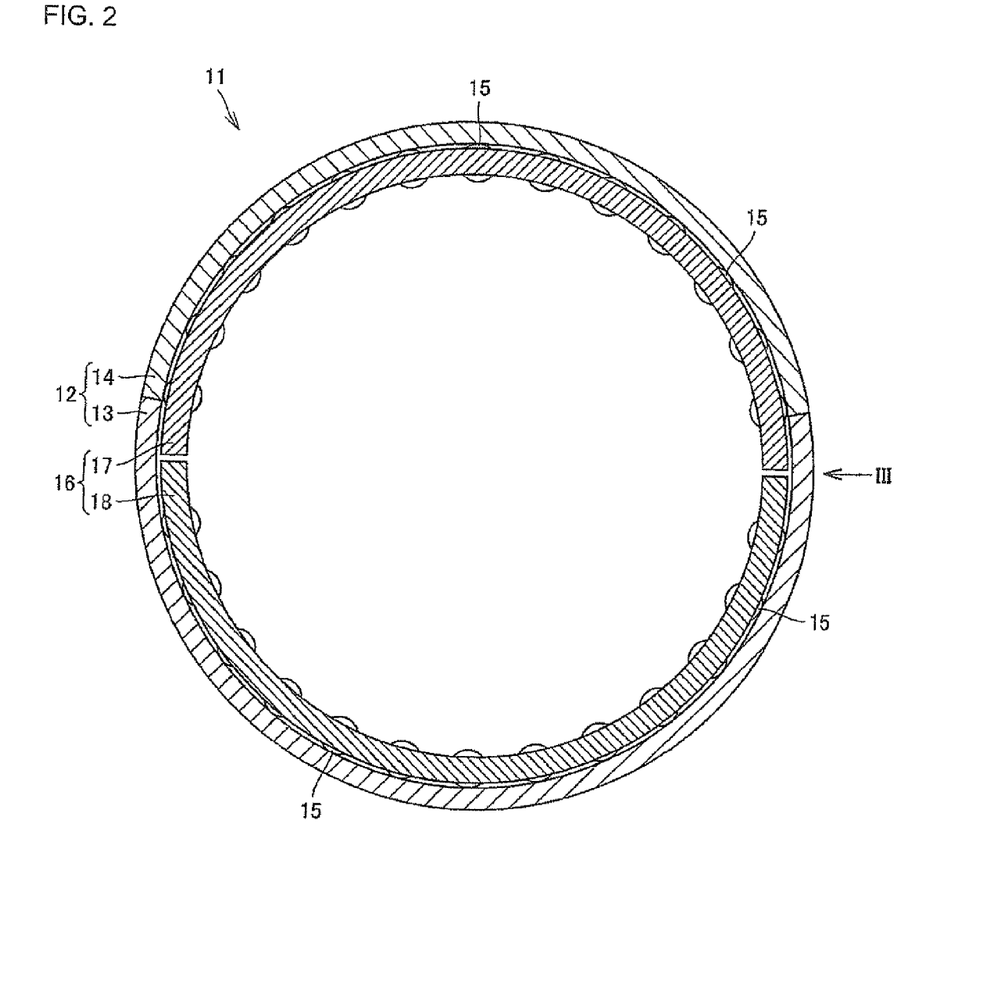
FIG. 2 is a view showing the needle roller bearing according to one embodiment of the present invention.
Figure 3:
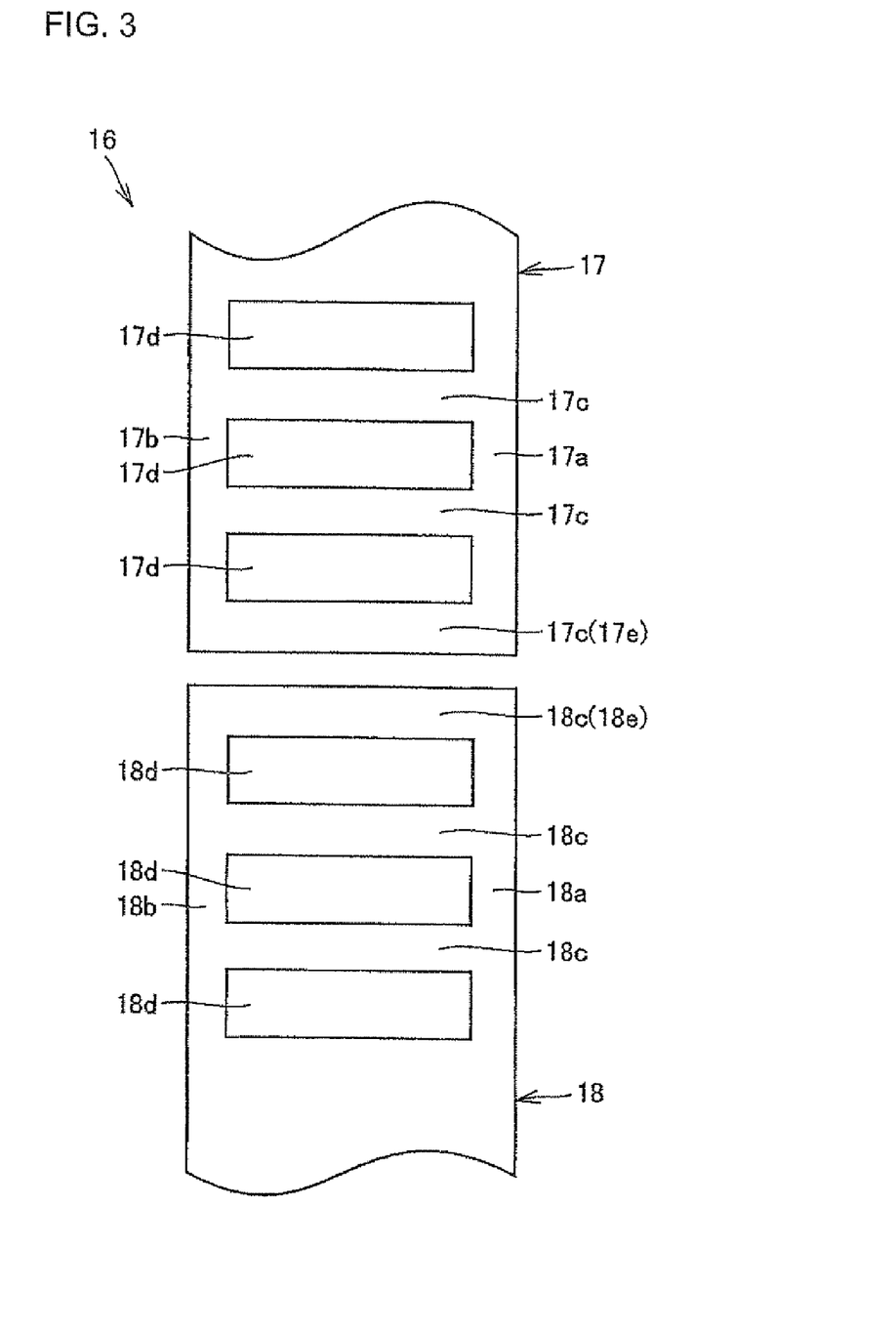
FIG. 3 is a view showing a retainer taken from a direction of an arrow III in FIG. 2.

First, referring to FIGS. 2 and 3, the needle roller bearing 11 includes an outer ring 12, a plurality of needle rollers 15 arranged along an inner diameter surface of the outer ring 12, and a retainer 16 to retain intervals between the adjacent needle rollers 15. Since the outer ring 12 and the needle roller 15 are linearly in contact with each other, the above needle roller bearing 11 has an advantage of being high in load capacity and high in rigidity while a bearing projected area is small, so that it is used in various fields, including a car.

Referring to FIG. 2, the outer ring 12 is formed by connecting a plurality of arcuate outer ring members in a circumferential direction. In addition, one outer ring member having a center angle larger than 180° is included among the plurality of outer ring members. According to this embodiment, the cylindrical outer ring 12 is composed of a first outer ring member 13 having a center angle larger than 180° and a second outer ring member 14 having a center angle smaller than 180°.

The retainer 16 is formed by connecting two semi-circular retainer segments 17 and 18 in the circumferential direction. Referring to FIG. 3, the retainer segment 17 includes a pair of ring sections 17a and 17b, and a plurality of column sections 17c arranged between the pair of ring sections 17a and 17b. In addition, a pocket 17d for housing the needle roller 15 is formed between the adjacent column sections 17c. The retainer segment 18 is similarly configured, in that includes a pair of ring sections 18a and 18b, and a plurality of column sections 18c arranged between the pair of ring sections 18a and 18b.

In addition, since the column sections 17c and 18c are adjacent to each other at an abutment part of the two retainer segments 17 and 18, the interval of the needle rollers 15 arranged at both sides of the abutment part is larger than the other part. Hereinafter, the column sections arranged in circumferential ends of the retainer segments 17 and 18 are referred to as column sections 17e and 18e to be distinguished from the other column sections.

While a production method of the above outer ring 12 is not limited in particular, the following method can be used, for example. First, a pipe material serving as a start material is treated with a turning process to form a cylindrical member having a predetermined outer diameter dimension, inner diameter dimension, and width dimension. Then, heat treatment is performed to obtain a predetermined mechanical property. More specifically, average hardness of 653 Hv or more is provided by bright quenching treatment. In addition, tempering treatment is preferably performed to reduce residual stress and internal distortion generated in the bright quenching treatment, and improve toughness and stabilize dimension.

Then, the surface of the cylindrical member, especially the inner diameter surface thereof serving as a track surface is treated with a grinding process. When the surface roughness of the track surface is set to a predetermined value, friction resistance between the track surface and the needle roller 15 can be reduced and torque loss and heat generation can be prevented at the time of rotation. As a result, the long-lived and highly-reliable needle roller bearing 11 can be provided.

Then, the cylindrical member is subjected to impact and circumferentially split to the first and second outer ring members 13 and 14. At this time, since the end surface of the split part is not treated with a grinding process, the split surface has irregularities generated when split. The cylindrical outer ring 12 is formed by abutting the corresponding end surfaces when the bearing is used.

In addition, by previously forming a notch such as a V-shaped groove in the part to split (outer diameter surface or end surface), stress concentrates at the root of the V-shaped groove, and the cylindrical member can be split from this part as an origin point. As a result, the first and second outer ring members 13 and 14 having desired center angles can be easily provided.

Such production method is called a "natural cracking". The natural crackinging can reduce production procedures and a processing time as compared with a method using a cutting tool to cut the outer ring 12. As a result, the needle roller bearing 11 can be improved in productivity.

While a production method of the above retainer 16 is not limited in particular, the following method is used, for example. First, a pipe material formed of a metal material such as SCM, SCr, SNCM is processed into a cylindrical member having a predetermined shape. Then, the plurality of pockets 17d and 18d are formed so as to penetrate the cylindrical member in a thickness direction from the outer diameter surface thereof.

Next, the cylindrical member is subjected to heat treatment to obtain a predetermined mechanical property. More specifically, average hardness 450 Hv or more is provided by carburizing quenching treatment or carbonitriding quenching treatment. In addition, it is preferable to perform tempering treatment after the above quenching treatment. Then, the cylindrical member is cut at two positions on the circumference (180° apart) and the semi-circular retainer segments 17 and 18 are provided.

In addition, the "semi-circular retainer segment" in this specification is not limited to the one having the center angle of 180° strictly. That is, the "semi-circular retainer segment" includes the one having the center angle which is a little smaller than 180° but can be regarded as 180° substantially.

More specifically, a gap is provided at an abutment part of retainer segments 17 and 18 corresponding to a thickness of a cutting tool to cut the cylindrical member. When the retainer segment is used under the high temperature condition, it is necessary to provide a minute gap at an abutment part of retainer segments 17 and 18. However, for the reason described above, the "semi-circular retainer segment" includes the one having the center angle which is a little smaller than 180° but can be regarded as 180° substantially.

Next, a description will be made of various dimensional relationships in the needle roller bearing 11 with reference to FIG. 1. In addition, in FIG. 1, solid lines show the first outer ring member 13, the column sections 17c and 18c positioned at the circumferential ends of the retainer segments 17 and 18 (that is, the abutment part of the retainer segments 17 and 18), and the needle rollers 15 housed in the pockets 17d and 18d adjacent to those column sections 17c and 18c, and broken lines show the parts other than the above parts.

First, it is assumed that reference D represents an inner diameter dimension of the outer ring 12, reference r represents a radius of the needle roller 15, reference d represents an outer diameter dimension of the retainer 16, and reference X represents a length of a line segment $l_1$ connecting circumferential ends of an inner diameter surface of the first outer ring member 13 (called the "cut site dimension"). In addition, the inner diameter dimension D of the outer ring 12 coincides with a circumscribed circle diameter of the plurality of needle rollers 15 housed in the retainer 16.

In addition, a line $l_2$ passing through the center of the outer ring 12 and parallel to the line segment $l_1$ passes through the abutment part of the retainer segments 17 and 18, that is, the boundary part of the column sections 17e and 18e. At this time, reference $l_3$ represents a line connecting the center of the needle roller 15 adjacent to the column sections 17e or 18e shown by the solid line to the center of the outer ring 12. Thus, reference θ represents an angle formed between the line $l_2$ and the line $l_3$.

Here, d<X<D and the above formula (1) have to be satisfied to incorporate the first outer ring member 13 without generating elastic deformation. Hereinafter, a description will be made of a method for incorporating the needle roller bearing 11 in a crankshaft 1 with reference to FIGS. 4 to 7.

In addition, the left-hand side of the formula (1) means a width dimension of a roller and retainer assembly in the direction of the line $l_2$ at the position of the needle roller 15 (the needle roller 15 shown by the solid line in FIG. 1) adjacent to the abutment part of the retainer segments 17 and 18 (closest to the line $l_2$).

Figure 4:
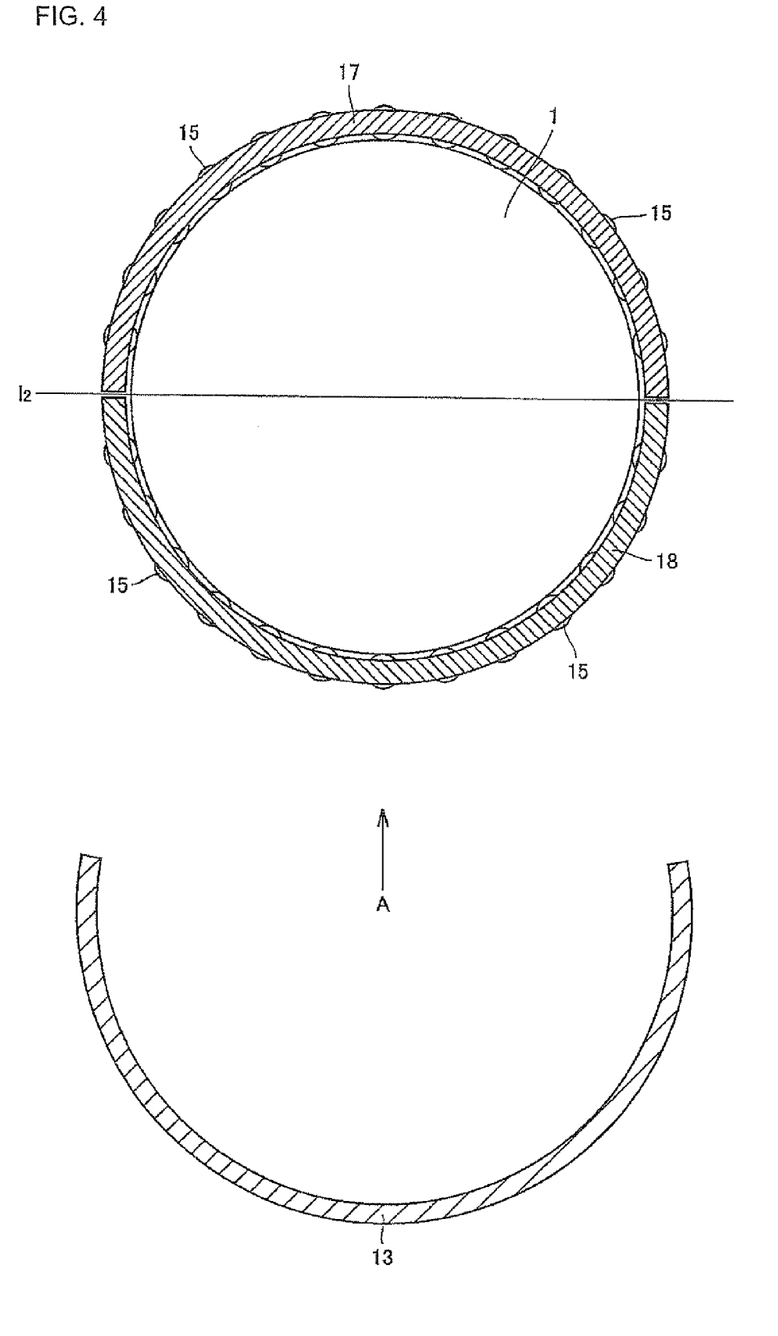
FIG. 4 is a view showing a step of incorporating the needle roller bearing shown in FIG. 2 into a crankshaft, and showing a state after roller and retainer assemblies have been incorporated.

Referring to FIG. 4, the needle rollers 15 are incorporated into the pockets 17d and 18d of the retainer segments 17 and 18, respectively to form roller and retainer assemblies. Then, the retainer segments 17 and 18 (the roller and retainer assemblies) are incorporated in the crankshaft 1 from a radial direction.

Then, the column sections 17c and 18c of the retainer 16 are arranged on the line $l_2$ (corresponding to the line $l_2$ in FIG. 1) which is perpendicular to an insertion direction (shown by an arrow A in FIG. 4) of the first outer ring member 13. According to this embodiment, the line $l_2$ passes through the two abutment parts of the retainer segments 17 and 18, that is, the boundary parts of the column sections 17e and 18e where each interval between the adjacent needle rollers 15 is largest. Then, the first outer ring member 13 is incorporated from the radial direction.

Here, in order to incorporate the first outer ring member 13 without generating elastic deformation, the cut site dimension X has to be larger than the maximum width dimension of the roller and retainer assembly in the direction (direction of the line $l_2$) which is perpendicular to the insertion direction of the first outer ring member 13.

When the width dimension of the roller and retainer assembly is largest on the line $l_2$, that is, when the maximum width dimension coincides with the outer diameter dimension of the retainer 16, d<X has to be satisfied. Meanwhile, when the width dimension of the roller and retainer assembly is largest at the position of the needle roller 15 adjacent to the abutment part of the retainer segments 17 and 18, the above formula (1) has to be satisfied.

Figure 5:
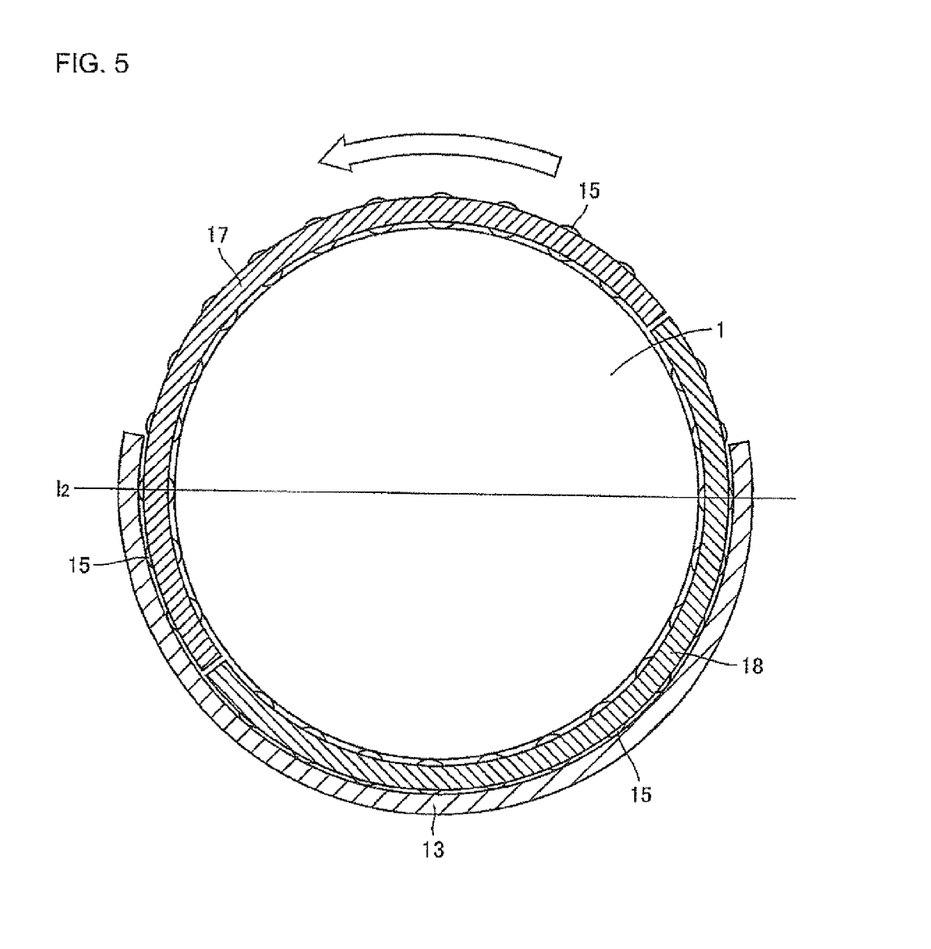
FIG. 5 is a view showing a step of incorporating the needle roller bearing shown in FIG. 2 into the crankshaft, and showing a state after a first outer ring member has been incorporated in the crankshaft.

Referring to FIG. 5, the roller and retainer assembles are rotated so that the needle rollers 15 are positioned on both sides of the line $l_2$. Here, since the cut site dimension X is largest (X=D) when the center angle is 180°, X<D is always satisfied in this embodiment. Consequently, since the cut site dimension X is smaller than the circumscribed circle diameter of the needle roller 15, the first outer ring member 13 can be prevented from dropping out in the above positional relationship.

Figure 6:
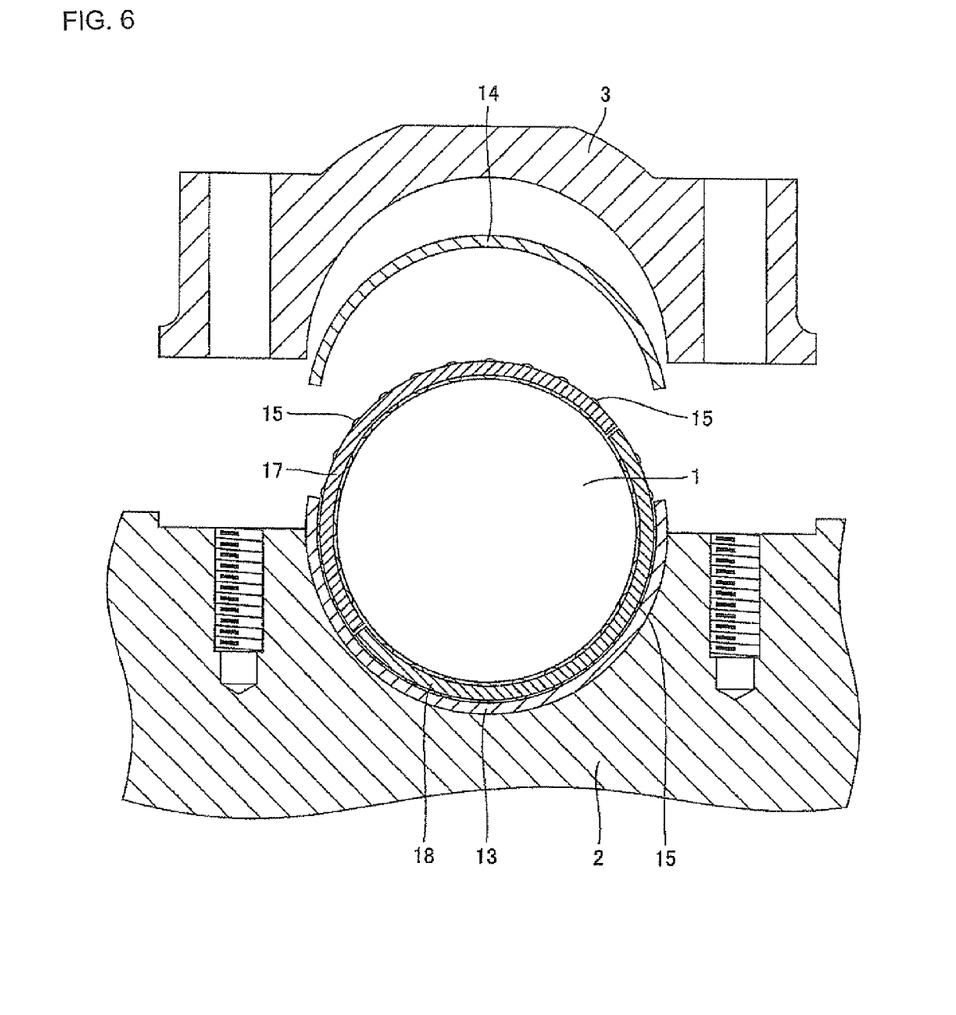
FIG. 6 is a view showing a step of incorporating the needle roller bearing shown in FIG. 2 into the crankshaft, and showing a state after the needle roller bearing has been set on a crankcase.

Referring to FIG. 6, the needle roller bearing 11 is set on a crankcase 2. Then, referring to FIG. 7, the second outer ring member 14 is arranged so as to be circumferentially connected to the first outer ring member 13, whereby the cylindrical outer ring 12 is formed. Thus, the assembly of the needle roller bearing 11 is completed. Furthermore, the needle roller bearing 11 is covered with a bearing cap 3, and the crankcase 2 and the bearing cap 3 (hereinafter, referred to as the "housing" collectively) are fastened with a bolt. Thus, a crankshaft support structure is completed.

Figure 7:
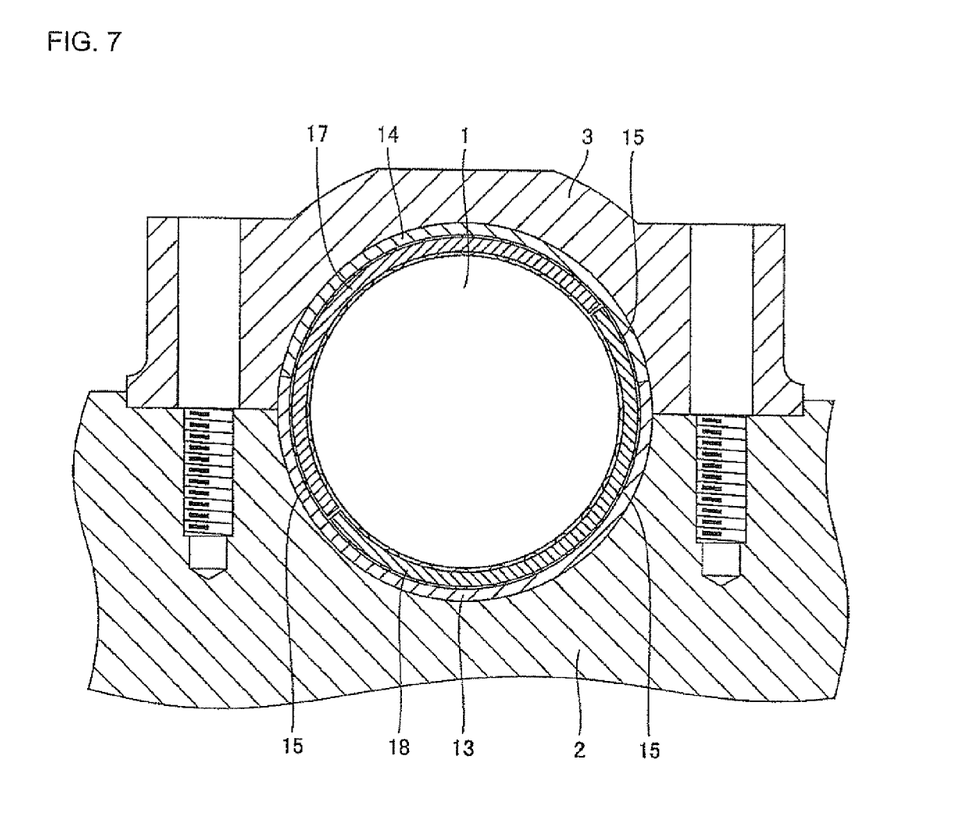
FIG. 7 is a view showing a crankshaft support structure according to one embodiment of the present invention.

According to the above assembly method, since the first outer ring member 13 is prevented from dropping out during the assembly operation, the assembly property of the needle roller bearing 11 is improved. In addition, since a circlip to prevent the outer ring 12 from dropping out can be omitted, the number of components can be reduced.

Here, since the outer ring 12 is split unequally, the abutment part of the first and second outer ring members 13 and 14 never coincides with the abutment part of the housings. As s result, the crankshaft support structure can be effectively prevented from generating assembly shift in a radial direction.

The "assembly shift" means the state in which the crankcase 2 and the bearing cap 3, and the first outer ring member 13 and the second outer ring member 14 are radially shifted after assembled. This could occur when the outer ring is equally divided into two (center angle is 180°) and the abutment part of the outer rings coincides with the abutment part of the housings.

In addition, although the outer ring 12 is split into two (first and second outer ring members 13 and 14) in the above embodiment, the present invention is not limited to this, and it may be split into three as long as one center angle is larger than 180°.

In addition, although the column sections 17e and 18e are arranged on the line $l_2$ when the first outer ring member 13 is incorporated in the above embodiment, the effect of the present invention can be obtained as long as the above various dimensional relationships are satisfied even when the other column sections 17c and 18c are arranged thereon. However, since the value of the left-hand side of the formula (1) becomes small with increasing distance between the target needle roller 15 and the line $l_2$, the cut site dimension X of the first outer ring member 13 can be small by the above method, that is, the center angle of the first outer ring member can be large.

Figure 8:
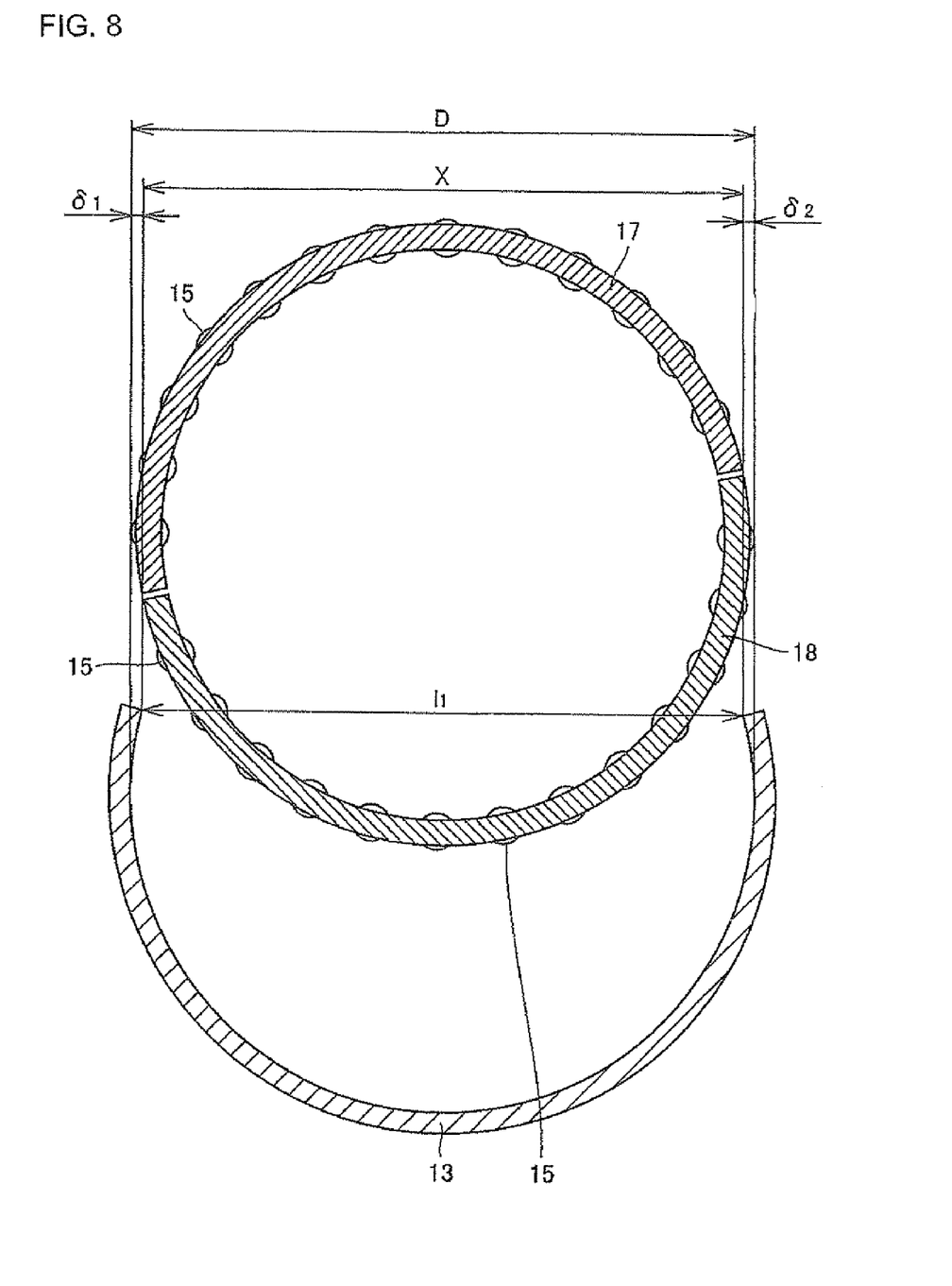
FIG. 8 is a view showing various dimensional relationships in a needle roller bearing according to another embodiment of the present invention.

Next, a description will be made of various dimensional relationships in a needle roller bearing 11 according to another embodiment of the present invention with reference to FIG. 8. In addition, since the configuration of the needle roller bearing 11 has been described with reference to FIGS. 2 and 3, it will not be described.

First, it is assumed that reference D represents an inner diameter dimension of an outer ring 12, and reference X represents a length of a line segment $l_1$ connecting circumferential ends of an inner diameter surface of a first outer ring member 13 (called the "cut site dimension"). In addition, the inner diameter dimension D of the outer ring 12 coincides with a circumscribed circle diameter of a plurality of needle rollers 15 housed in a retainer 16.

Since the cut site dimension X is largest (X=D) when the center angle of the first outer ring member 13 is 180°, X<D is always satisfied in this embodiment. Therefore, when the first outer ring member 13 is incorporated in a roller and retainer assembly (provided after the needle rollers 15 have been incorporated in pockets 17d and 18d), an elastic deformation volume δ of the cut site dimension is such that $\delta = D-X(=\delta_1+\delta_2)$.

Here, the various dimensions in the first outer ring member 13 according to the present invention are set so as to satisfy 0<δ/D<0.003 (referred to as the "formula 2" hereinafter). For example, when the inner diameter dimension of the outer ring 12 is such that D=40 mm, and the cut site dimension is such that X=39.9 mm, the elastic deformation volume is such that δ=0.1 mm (δ/D=0.0025).

Figure 11:
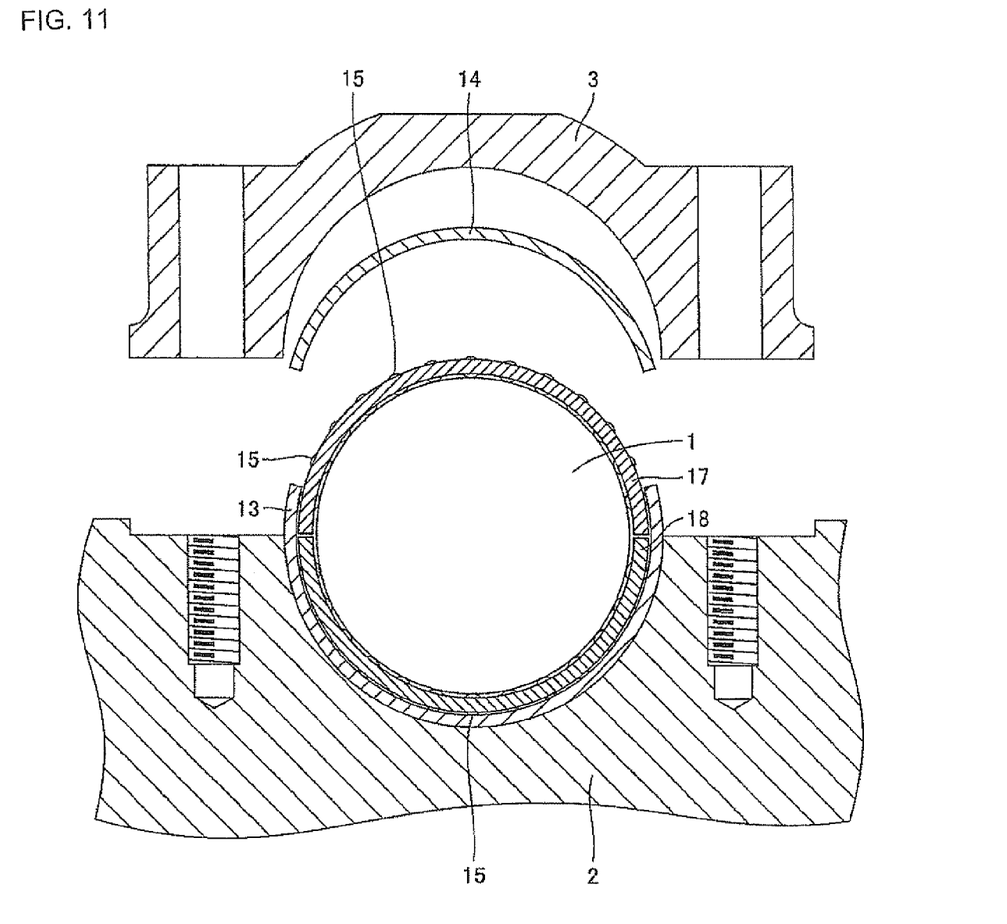
FIG. 11 is a view showing a step of incorporating the needle roller bearing according to another embodiment of the present invention to the crankshaft, and showing a state after the needle roller bearing has been set on the crankcase.
Figure 12:
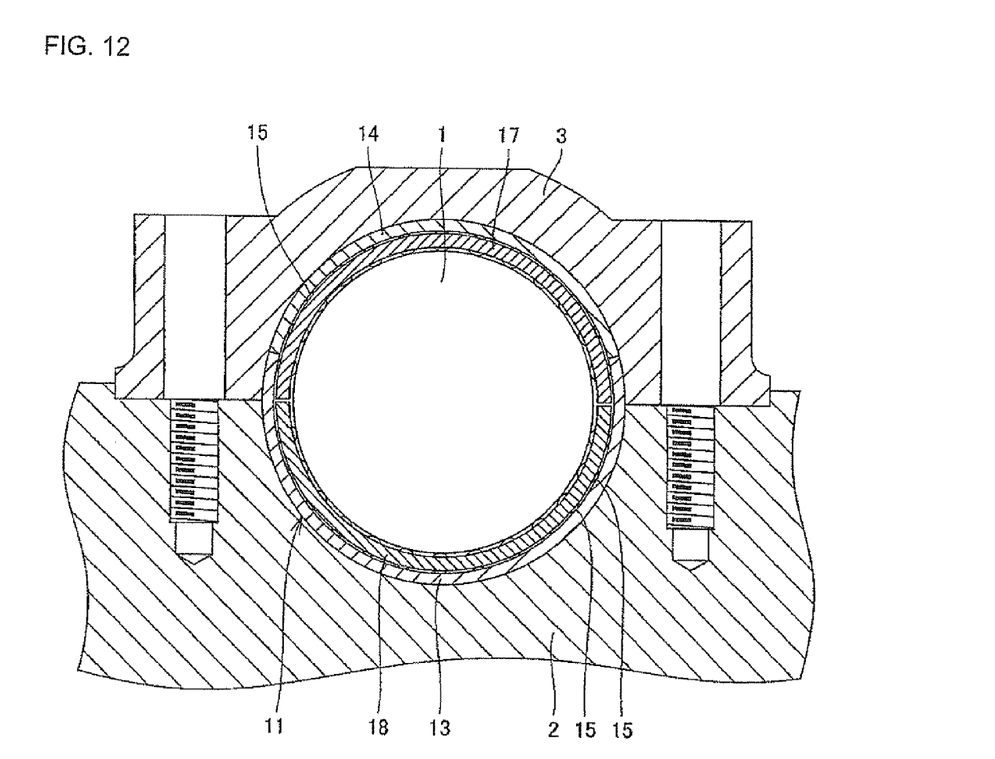
FIG. 12 is a view showing a crankshaft support structure according to another embodiment of the present invention.

A description will be made of a method for incorporating the needle roller bearing 11 into the crankshaft 1 with reference to FIGS. 9 to 12. In addition, FIG. 9 is a view showing a state after a roller and retainer assembly has been incorporated, FIG. 10 is a view showing a state after the first outer ring member 13 has been incorporated, FIG. 11 is a view showing a state after the needle roller bearing 11 has been set on the crankcase 2, and FIG. 12 is a view showing a state after the incorporation has been completed.

Figure 9:
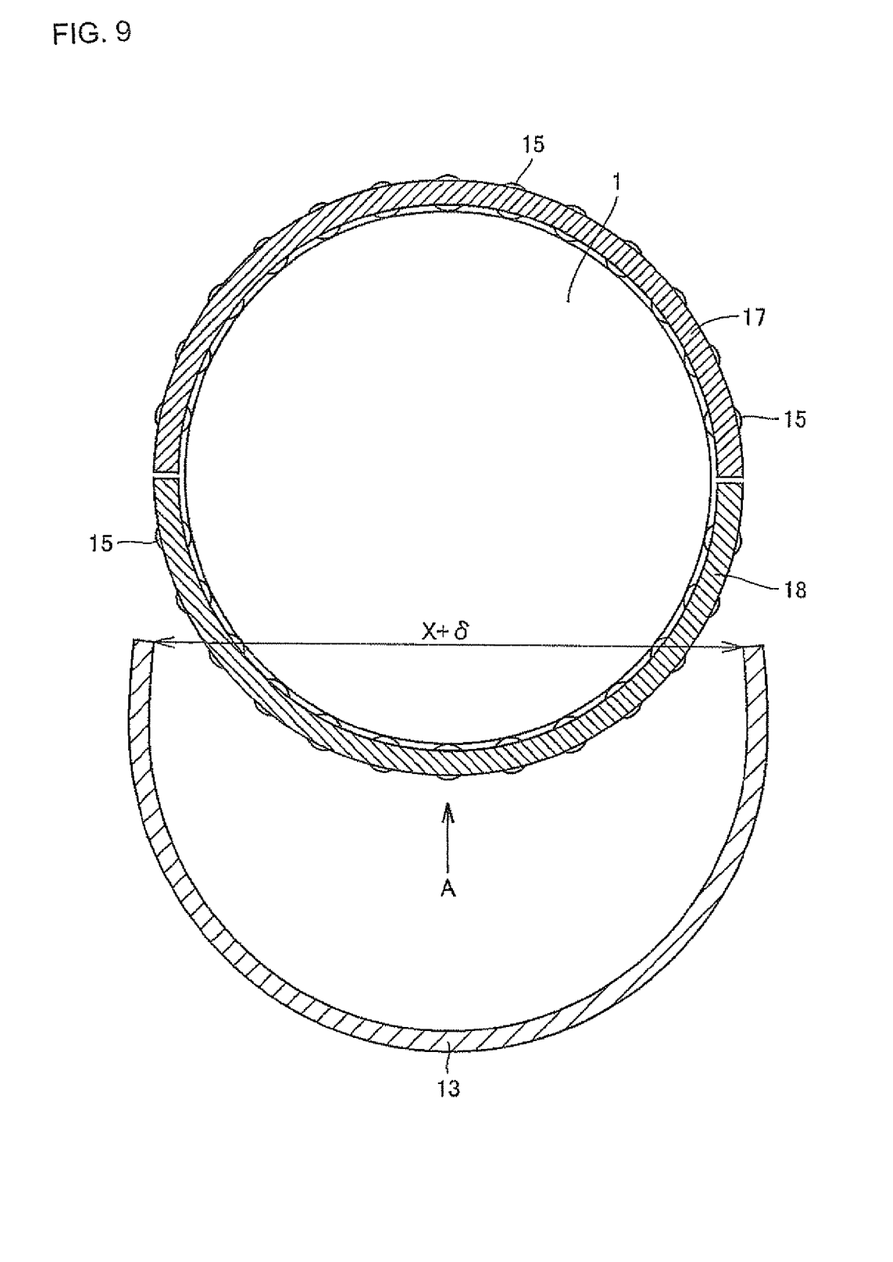
FIG. 9 is a view showing a step of incorporating the needle roller bearing according to another embodiment of the present invention to the crankshaft, and showing a state after roller and retainer assemblies have been incorporated.

First, referring to FIG. 9, the roller and retainer assemblies are formed by incorporating the needle rollers 15 into the pockets 17d and 18d of retainer segments 17 and 18. Then, each of the retainer segments 17 and 18 (roller and retainer assemblies) is incorporated from the radial direction of the crankshaft 1.

Then, the first outer ring member 13 is incorporated into the roller and retainer assemblies while elastically deformed in a direction of (X+δ) to increase the cut site dimension X. At this time, since the elastic deformation volume δ of the cut site required for the incorporation is limited within the range shown by the formula 2, the first outer ring member 13 can be easily incorporated even when it is thick.

Figure 10:
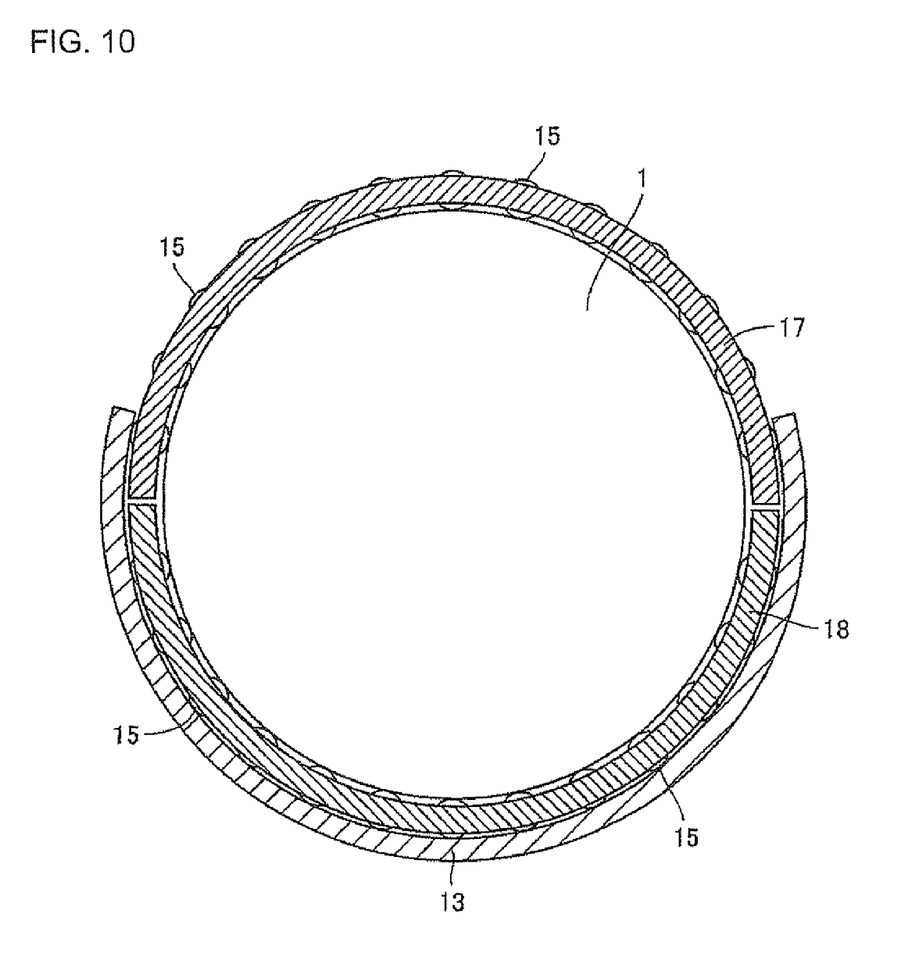
FIG. 10 is a view showing a step of incorporating the needle roller bearing according to another embodiment of the present invention to the crankshaft, and showing a state after a first outer ring member has been incorporated in the crankshaft.

Then, referring to FIG. 10, after the first outer ring member 13 has been incorporated, the first outer ring member 13 returns to its natural state (which means the state in which it is not elastically deformed). At this time, since the cut site dimension X is smaller than the circumscribed circle diameter (=D) of the needle rollers 15, the first outer ring member 13 is prevented from dropping out in the following incorporating processes.

Then, referring to FIG. 11, the needle roller bearing 11 is set on the crankcase 2. Then, referring to FIG. 12, the second outer ring member 14 is arranged so as to be circumferentially connected to the first outer ring member 13, whereby the cylindrical outer ring 12 is formed. Thus, the incorporation of the needle roller bearing 11 is completed. Furthermore, the needle roller bearing 11 is covered with the bearing cap 3, and the crankcase 2 and the bearing cap 3 (referred to as the "housing" hereinafter collectively) are fastened with a bolt. Thus, the assembly of a crankshaft support structure is completed. Thus, in this case also, the assembly property of the needle roller bearing 11 is improved.

In addition, although the retainer 16 is composed of the semi-circular retainer segments 17 and 18 in the above embodiment, any configuration may be employed as long as it can be incorporated in the crankshaft 1 from the radial direction. For example, a cylindrical retainer may be composed of circumferentially connected three retainer segments, and each center angle may be differentiated.

Alternatively, the retainer may be an integral retainer (so-called "C-type retainer") having a split line extending in an axial direction on one circumference. In this case, since the retainer is incorporated in the crankshaft 1 while elastically deformed in a direction to open up the split line, it is preferably formed of a resin material having high elastic deformability. The resin material is preferably an injection moldable synthetic resin, and its heat resistance temperature is preferably 120° C. or more because the retainer is used in a high-temperature environment. More specifically, nylon 66, or nylon 46 may be employed.

Figure 13:
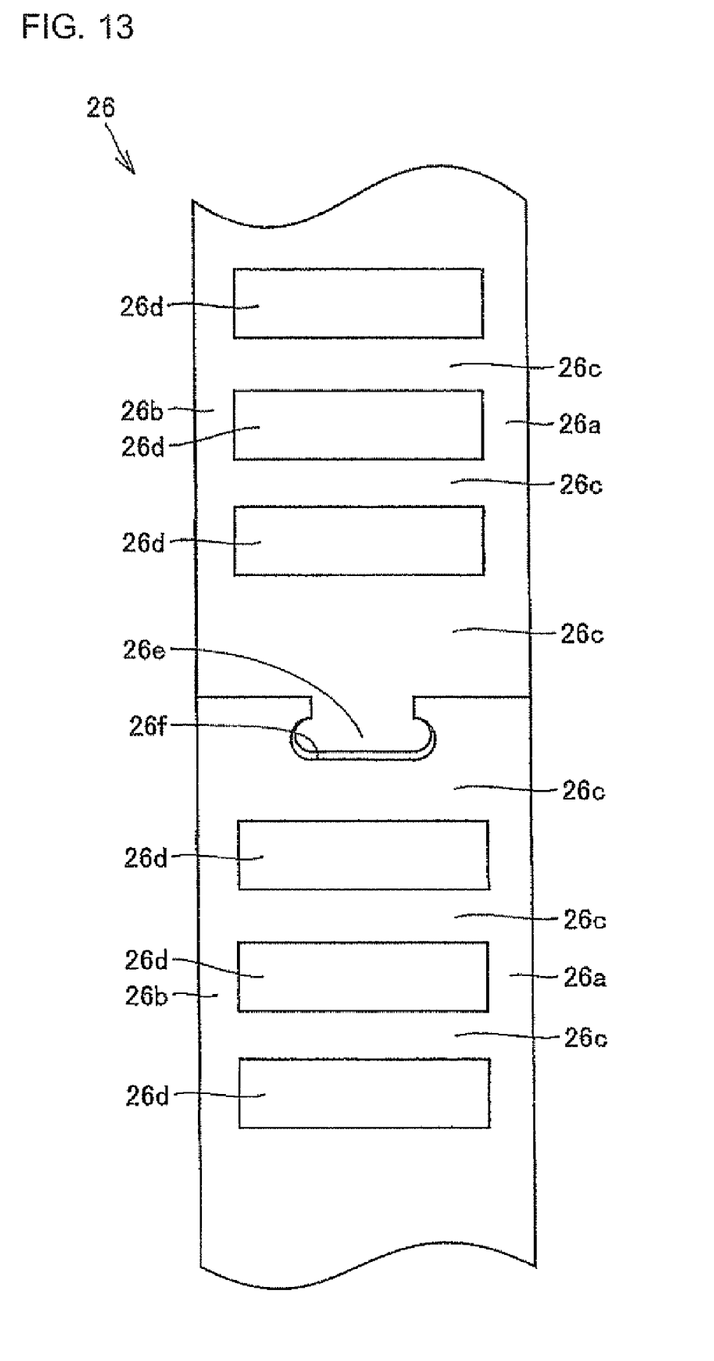
FIG. 13 is a view showing an abutment part of a retainer according to another embodiment.

Furthermore, referring to FIG. 13, a projection 26e is provided at one side end surface of a split part so as to project toward the other side, and a recession 26f is provided at the other side end surface of the split part so as to receive the projection 26e. Thus, a cylindrical retainer 26 is preferably provided by engaging the projection 26e with the recession 26f. The retainer segment 26 includes a pair of ring sections 26a and 26b, and a plurality of column sections 26c arranged between the pair of ring sections 26a and 26b. In addition, a pocket 26d for housing a needle roller is formed between the adjacent column sections 26c.

The needle roller bearing 11 can be applied to crankshafts of the various engines in cars and two-wheel vehicles. In addition, while the engine may be a single-cylinder or multi-cylinder engine, when the present invention is applied to the crankshaft used in the multi-cylinder engine having a shaft section whose both ends are sandwiched by crank arms as shown in a part P in FIG. 14, a great effect can be expected.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The invention claimed is:

1. A needle roller bearing comprising:
a cylindrical outer ring formed by circumferentially connecting a first outer ring member having a center angle larger than 180° and a second outer ring member having a center angle smaller than 180°;
a plurality of needle rollers arranged along an inner diameter surface of said outer ring; and
a retainer including a pair of ring sections and a plurality of column sections arranged between said pair of ring sections, and having pockets for housing the plurality of needle rollers, between adjacent column sections, wherein
$d \leq x \leq D$ and a formula (1) below are satisfied in which reference D represents an inner diameter dimension of said outer ring, reference r represents a radius of said needle roller, reference d represents an outer diameter dimension of said retainer, and reference X represents a length of a line segment $l_1$ connecting circumferential ends of an inner diameter surface of said first outer ring member, and when a line $l_2$ passing through the center of said outer ring and parallel to the line segment $l_1$ passes through the center of one of said plurality of column sections, reference $\theta$ represents an angle formed between the line $l_2$ and a line $l_3$ connecting the center of said needle roller adjacent to the above column section to the center of said outer ring,

[Formula 1]

$$2\left\{\left(\frac{D}{2} - r\right)\cos\theta + r\right\} < X. \quad (1)$$

2. The needle roller bearing according to claim 1, wherein said retainer is formed by circumferentially connecting two semi-circular retainer segments, and
said needle roller bearing satisfies said formula (1) by each of two abutment parts of said retainer segments being positioned on said line $l_2$.

3. The needle roller bearing according to claim 1, satisfying $$0 < (D-X)/D \leq 0.003$$

in which reference D represents the inner diameter dimension of said outer ring, and reference X represents the length of the line segment connecting the circumferential ends of the inner diameter surface of said first outer ring member.

4. The needle roller bearing according to claim 1, wherein said outer ring is split into said first outer ring member and said second outer ring member by natural cracking.

5. The needle roller bearing according to claim 1, wherein said outer ring is subjected to bright quenching treatment, and said outer ring has average hardness of 653 Hv or more.

6. The needle roller bearing according to claim 1, wherein said retainer is formed of a metal material having been subjected to carburizing quenching or carbonitriding quenching treatment, and
said retainer has average hardness of 450 Hv or more.

7. The needle roller bearing according to claim 1, wherein said retainer is formed of an injection moldable synthetic resin, and said retainer has a heat resistance temperature of 120° C. or more.

8. The needle roller bearing according to claim 1, wherein said retainer is a split type retainer having a split line extending in an axial direction, on its circumference.

9. A crankshaft support structure comprising:
a crankshaft; and
the needle roller bearing according to claim 1 to rotatably support said crankshaft.

* * * * *